Aug. 10, 1965    R. S. FLEMING    3,199,879
PIPE SEALING UNIT

Filed Oct. 16, 1962    2 Sheets-Sheet 1

INVENTOR.
ROBERT S. FLEMING
BY
Kane, Dalsimer & Kane
ATTORNEYS

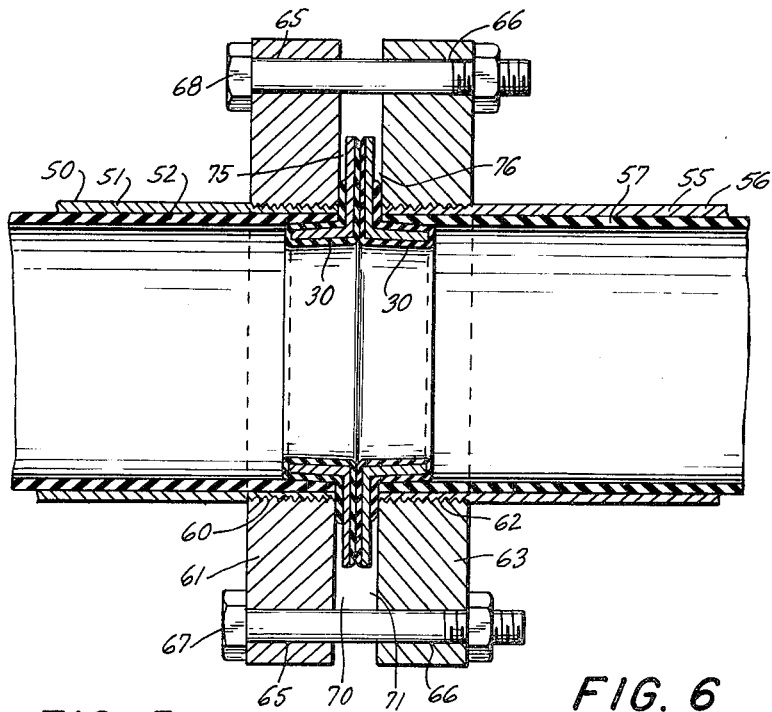
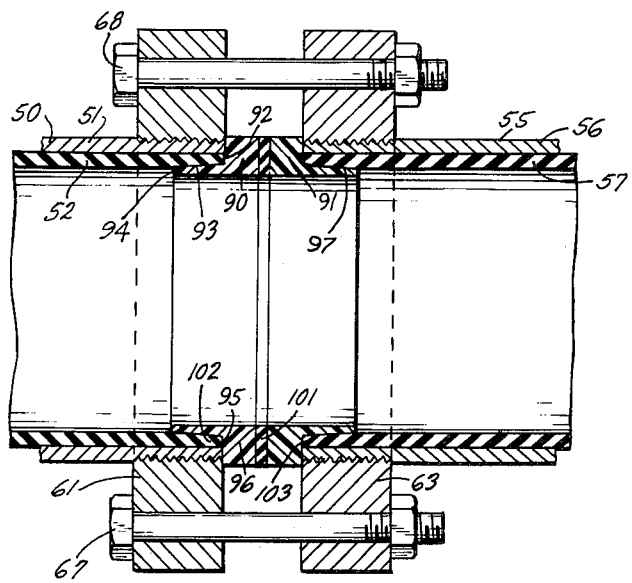
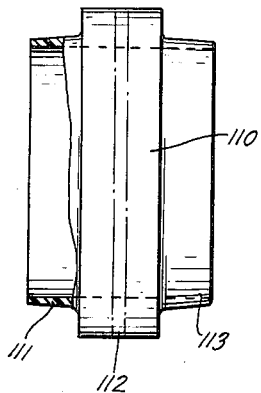

United States Patent Office 3,199,879
Patented Aug. 10, 1965

3,199,879
PIPE SEALING UNIT
Robert S. Fleming, Pompton Plains, N.J., assignor to Amerace Corporation, New York, N.Y., a corporation of Delaware
Filed Oct. 16, 1962, Ser. No. 230,828
1 Claim. (Cl. 277—212)

This invention relates to an insertable sealing ring adaptable for making joints in lined pipes, and particularly to a sealing ring that may be readily inserted when pipes are fitted in the field.

Pipe couplings used for joining lined pipes, that are to carry corrosive fluids and which must withstand high pressure, have normally in the past had to be pre-cut at the factory. This practice has arisen because the fit of such a joint must be exceedingly accurate for it to maintain its integrity. Accordingly, lined pipe systems have had to be engineered very carefully in advance, and the dimensions determined, usually to a factor of plus or minus one-eighth inch for the average one to two inch diameter pipe. In addition, if the pipes are held together with the usual bolted flanges, it has been found necessary to determine the angular relationship of the bolt holes in advance within a very few degrees. Naturally, this has added to the cost of design and construction of many an industrial plant, and often has introduced delays. In addition, the necessity for factory-made couplings has resulted in an inability, on the part of the contractor or engineer on the site, to vary the design even to the slightest degree, as he constructs the plant, even when he notes favorable changes that may be made.

Efforts have been made previously to create a pipe seal or coupling that may be installed in the field. These efforts have, in general, been unsatisfactory, either as a result of higher costs, or inefficient sealing. The joints that have been offered for sale have required a high degree of accuracy in the cutting of the pipe to make certain that the cut is exactly at right angles to the axis of the pipe. They have also required, in many instances, very careful internal boring of the pipe lining to make the necessary precise fit. Needless to say, that in addition to the problems created by this precision, errors can creep in and result in a faulty joint.

The present invention is particularly applicable to provide a joint usable with lined pipes, for example, rubber lined pipes. Such pipes are now in quite common use in the handling of more or less corrosive fluids where the fluid to be conveyed through the pipe is one which might corrode, or in some way react with, those metals which are usable in the making of the pipes. When using our invention, the cutting of the pipe, of course, is preferably done as accurately as possible, but it need not be done with the critical degree previously required.

Therefore, it is an object of this invention to provide an insertable sealing ring which, due to the nature of the forces involved, will retain a tight seal when positioned in the pipe, and will enable the user to make a butt-joint between two such rings. It is also possible, though less preferable in many instances, to have a single seal that is inserted in the two ends of the two pipes to be joined.

It is a further object of this invention to provide such a seal that may be readily used by persons not highly skilled or trained in the field of pipe joints, and, in particular, one that may be used in the field as the pipe is built into an industrial plant or other establishment.

It is a further object of this invention to provide a sealing ring that enables one to produce butt-type joints in lined pipes similar to the joint presently made with factory installed flange structures, and yet have the simplicity of field installation with the integrity of a factory joint.

These and other objects are accomplished by using a sealing ring of a particular structure adapted to fit within the liner of the pipe and having a slight angle of the outer circumference to the axial so that a tight seal is effected with the lining of the pipe. In this respect, it should be noted that it has been found that an inner seal with such a slight angle, preferably between four and fifteen degrees of the axis, will, when axial pressure is applied by the sealing flanges, have the tendency to create great sealing force acting in a radial direction and pressing against the inner seal of the pipe. This outwardly exerted force exceeds by a large factor the actual axial force applied.

This invention will be better understood in the details set forth below in the description, together with the accompanying drawings in which:

FIG. 4 is a longitudinal sectional view of a pipe joint that has been made utilizing a pair of sealing rings of the type of our invention;

FIG. 5 is a longitudinal sectional view of a pipe joint in which a modification of the sealing rings of our invention is used; and FIG. 6 shows a further modification, partially in section, of the sealing ring in which a pair of sealing rings have been joined together for use in certain types of installations.

Figure 1:
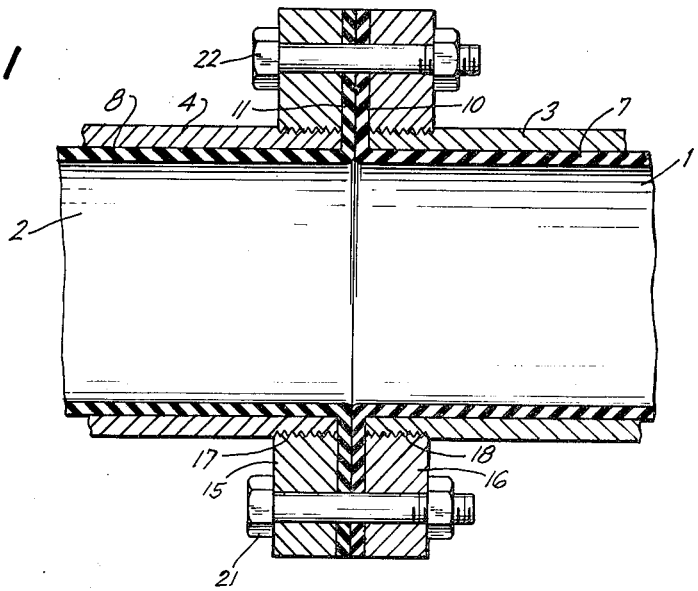
FIG. 1 is a view substantially in central longitudinal section showing a pair of pipe ends coupled in accordance with the practice of the prior art. The pipes, in this case, are relatively thin metal and are lined with a soft elastomeric material.

Turning to FIG. 1, we see there the joint in longitudinal sections of two lined thin walled pipes 1 and 2. These pipes have outer metallic walls 3 and 4, respectively, and are lined with an elastomeric material, such as rubber, at 7 and 8 respectively. The lining, however, has been extended beyond the joint ends of the pipe. Thus lining 7 has been extended beyond the end of pipe 3 and at right angles to the ends as is shown at 10. Similarly, lining 8 has been extended beyond the end of pipe 4 at right angles as shown at 11. This extension continues for the entire circumference of each of the pipes and extends a distance radially sufficient to fit within and fill the space between flanges.

The two pipes are joined by use of flanges 15 and 16 secured by threads 17 and 18 to the respective pipes 4 and 3. At the time of installation of the system, the pipes are placed end to end, and bolts 21 and 22 inserted through flanges 15 and 16 and drawn up tightly to hold the flanges together and to compress the lining extensions 10 and 11.

As can be seen from FIG. 1, the lining extensions 10 and 11 are integral with the pipe lining 7 and 8. This means that they must be factory installed and vulcanized in place. In order to accomplish this, the flanges 15 and 16 must be installed at the same time in the factory; the length of the pipe must be exact; and the angular positioning of the bolt holes in the flange must be such that they will meet when the pipe is actually installed. This introduces not only delays, but also expense, and in many instances makes the installations difficult due to the possibility of error creeping in.

Figure 2:
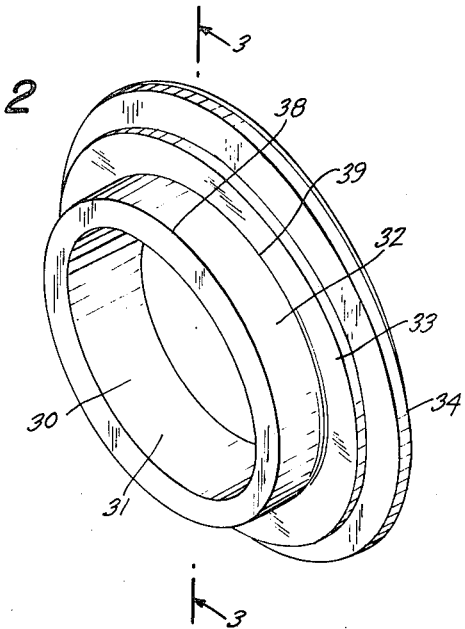
FIG. 2 is a perspective of the preferred form of the sealing ring of our invention.

The sealing ring of my invention is so designed that it may be effectively substituted for the integral extension of the liner as shown in FIG. 1. The preferred form of my sealing ring is that shown in FIG. 2. The ring 30 includes inner surface 31, of diameter equal to or slightly smaller than the internal diameter of the pipe lining; and outer bevelled surface 32, of diameter such that it can fit within the lining of the pipe, a shoulder 33, and a sealing flange 34. The outer surface 32 of ring 30 has an outer diameter that is non-uniform and very slightly conical in the portion adjacent the edge 38 farthest removed from the sealing flange 34. The inner edge of the outer surface 32, that is the edge 39 adjacent shoulder 33 is of slightly greater diameter than the edge 38. Preferably this larger diameter should be almost as great as the inner diameter of the pipe to be joined, that is, almost as great as the outer diameter of the pipe lining. The outer surface 32 should vary in diameter uniformly between the inner edge 39 and the outer edge 38. The diameter of the conical surface toward the outer edge 38 is preferably equal to, or slightly smaller than the inner diameter of the liner on the pipe to be sealed.

This angular structure on surface 32, and its particular dimensioning, serves a multiple purpose. In the first instance, as a result of axial forces, to be later described, impressed upon the sealing ring, the sealing surface 32 will create greater outward forces, normal to surface 32, for sealing. In addition, the bevel allows axial forces on the pipe to be impressed on the sealing ring to draw the sealing rings closer with minimum resistance from the sealing forces themselves. In addition, the bevel and its uniformity causes the sealing ring to center itself within the pipe, and to set itself generally at right angles to the pipe upon the application of external axial force. Also, it is believed that the axial joining forces may create a shearing deformation between the surface of the pipe lining and the surface of the sealing ring, and enhance sealing. This shearing force is enhanced by reduction of the angle between surface 32 and the axis of ring 30.

Figure 3:
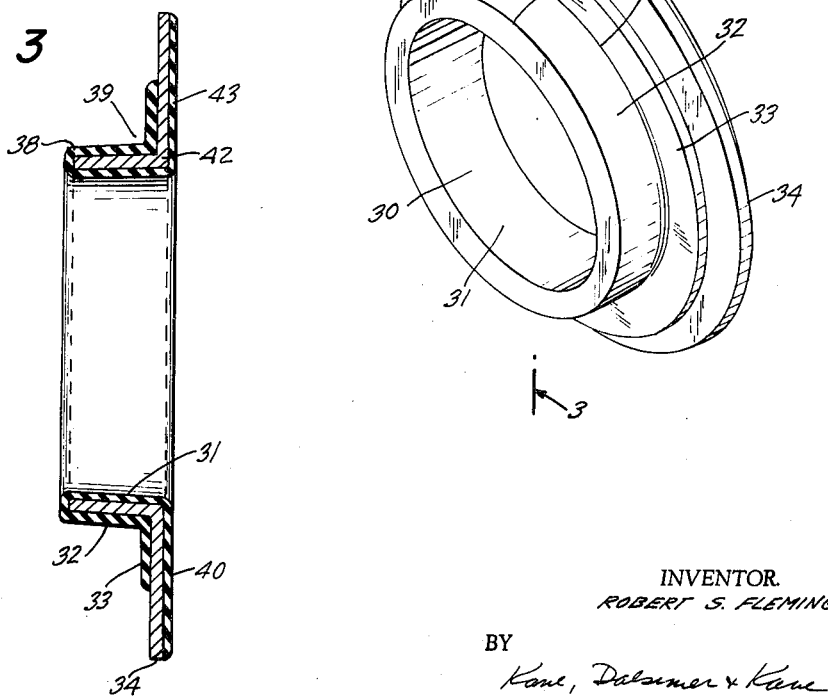
FIG. 3 is a section taken on line 3—3 of FIG. 2.

The internal construction of sealing ring 30 is best disclosed in the sectional view of FIG. 3. The ring may preferably be formed with an inner core 42 of a material capable of withstanding high pressures. This material may best be metallic, such as steel. Outside core 42 is a sealing and corrosion-resistant layer 43 normally surrounding the sealing ring on all surfaces which contact the fluid carried by the pipe, the pipe liner, or the corresponding mating sealing ring or gasket.

In use, a pair of sealing rings 30 are inserted in each of the pipe ends to be joined, as shown in FIG. 4. The pipe sections to be joined in that figure include pipe 50 with its thin metal outer wall 51 and its inner liner 52, and pipe 55 with an outer wall 56, and a liner 57. Pipe 50 has threads 60 on its outer circumference at its end adapted to engage corresponding threads on external flange 61. Comparably, pipe 55 has threads 62 adapted to receive flange 63. The flanges 61 and 63 are bored at 65 and 66 to receive bolts 67 and 68.

One method of using the sealing rings of this invention to effect a joint is to cut off the pipes reasonably squarely at the ends to be joined. They are then threaded on the outer surface near the end, as shown, with threads 60 and 62 and flanges 61 and 63, respectively. It is not necessary that the inner edges of the flanges exactly match the inner edge of the pipe as would be necessary in the factory designed joint, rather an approximation is sufficient; the objective here need be to have the bolt holes 65 and 66 line up in the final installation. The sealing rings 30 are then inserted inside the ends of pipes 50 and 56. Due to the slight bevel on surfaces 32 on the rings, they contact the inner surface linings of the pipes, that is, 52 and 57, and exert a radial force thereon. Comparably, liners 52 and 57 exert an equal inwardly radially directed force against the surfaces 32. Due to the nature of the forces in question, it is believed that the resulting pressures normal to the surface of sealing contact greatly exceed the applied axial pressure.

The outer diameter of the conical sealing ring surface 32 should be sufficiently great so that the usual amount of axial pressure through the flanges 61 and 63 will suffice to bring the inner surfaces of flanges 61 and 63 or the pipe ends into contact with shoulders 33 only after the bolting force is great enough to seal surface 32 and the pipe liner 52. This means that the greater portion of the axial pressure sealing the abutting surfaces 40 will be transmitted through pressure of the pipe liner against conical surface 32, thus improving the seal. Comparably, the compression between the two rings is a follow-up pressure tending to increase the seal between the ring and the pipe liner. Normally, an outer diameter at point 39 of surface 32 approximately equal to the outer diameter of the liner will be sufficient for this purpose. As a general rule, the conical surface should be at an angle of no more than fifteen degrees to the axis of the pipe and is preferably from about four degrees to about eight degrees. The greater the compressibility of the sealing materials and the pipe liner, the greater may be the angle of the surface.

Normally, the best seal is obtained if the surface 32 or the inner liner 52 of the pipe is made up of a soft, elastomeric material such as soft rubber. If liner 52 is not compressible, it is best to taper its bore slightly before inserting ring 30. Under some circumstances good seals are obtained if both surface 32 and liner 52 are elastomeric, but normally it is preferable to have only one of the two elastomeric.

Thus, it will be seen that through use of the sealing ring structure 30, dimensioned as above described relative to the pipes being joined, there will be created a seal, in effect, very similar to the butt-joint seal of the former prefabricated type shown in FIG. 1, and yet having the adaptability to be constructed on the site. It will also be noted that, within limits, pipes of different internal diameters may be joined by using sealing rings 30 that are correspondingly different in diameter, just as long as the abutting surfaces of the two rings correspond.

FIG. 5 shows the use of a modified ring, similar to ring 30, which, likewise, accomplishes the purposes of the present invention and is preferably used with a soft elastomeric pipe liner. Disclosed in FIG. 5 are two similar sealing rings 90 and 91. These rings are preferably made made of rigid plastic material, having sufficient strength and of a type not affected by the corrosive liquid to be carried by the pipe. One often satisfactory plastic is known in the trade as "Penton."

Ring 90 has inner diameter 92 (comparable to inner diameter 39) slightly smaller than the outer diameters of the respective pipe liners 52 and 57. Ring 90 has a surface 93 that is conical and corresponds to the surface 32 of ring 30. The outermost end 94 of that conical surface 93 has an outer diameter no greater than the inner diameter of the lining 52. Ring 90 has a shoulder portion 96 and a sealing surface 97. Ring 91 has a structure similar to that of ring 90.

In use, ring 90 is inserted in the inner diameter of the end of pipe 50, and ring 91 comparably inserted into pipe 55, after the flanges 61 and 63 have been mounted on each of the pipes. The pipes are then brought together, but before doing so, a soft elastomeric sealing gasket 101 is placed between rings 90 and 91. The pipes are then drawn together by the application of tightening force on the bolts 67 and 68, and the resulting forces created are similar to the forces created when the sealing rings shown in FIG. 4 are used.

Though the structures of sealing rings 32 and 90 are normally deemed preferable, since their use in a seal will compensate better for possible lack of ring angle cuts on the ends of the pipe, or lack of axial alignment of the pipe, there may be instances where the cuts are sufficiently precise, and the pipes are aligned carefully on the axis and secured well in that position. Under such circumstances, the rings and gasket of FIG. 5 may be combined into a unitary structure. Thus ring 90, sealing gasket 101, and ring 91 may be moulded integrally in one piece as shown in sealing ring 110 of FIG. 6. Though ring 110 is normally one piece and made entirely of one plastic, for comparative purposes, it has been divided by the use of dotted lines to show the respective portions and how they compare with the portions of FIG 5. Thus, there is section 111 comparing to ring 90, a mid-section 112, comparing to sealing gasket 101, and ring section 113 comparing to ring 91. In a structure of this nature the angular surfaces and shoulders are similar to those shown in the disclosure of FIG. 5.

While I have shown and described three different embodiments of the invention, it will be understood that some of the features of the different embodiments disclosed may be differently combined with other embodiments, and still remain within the spirit of the invention. Likewise, equivalents and variants of the disclosure will occur to those skilled in the art based upon the foregoing disclosure. I do not wish to be limited, therefore, except by the scope of the appended claim which is to be construed validly as broadly as the state of the prior art permits.

I claim:

A sealing ring adapted to be used in effecting joints of lined pipes for the carrying of corrosive liquids, said sealing ring being of generally circular configuration and having an aperture therethrough running axially thereof of diameter no greater than the inner diameter of the pipe liner, a surface along one side thereof lying in a plane perpendicular to the axis of said ring, and an outer surface comprising a conical portion and a shoulder portion, said shoulder portion being between said conical portion and said planar surface, and said conical portion having a diameter most removed from said planar surface substantially equal to the inner diamter of the liner of the pipe to be joined, and a diameter adjacent the shoulder thereof greater than said most removed diameter but less than the outer diameter of the liner of the pipe to be joined, said conical surface varying from its greater to its lesser diameter in substantially uniform manner, said sealing ring having a rigid internal core structure and an outer surface of elastomeric material.

References Cited by the Examiner

UNITED STATES PATENTS

| | | | |
|---|---|---|---|
| 1,891,424 | 12/32 | Kirkpatrick | 277—225 |
| 2,403,364 | 7/46 | Hertzell et al. | 277—225 |
| 2,517,290 | 8/50 | DeMoude et al. | 277—225 |
| 3,018,120 | 7/62 | Vann | 277—225 |

FOREIGN PATENTS 48,427   6/19   Sweden.

LEWIS J. LENNY, *Primary Examiner.*

EDWARD V. BENHAM, *Examiner.*